Aug. 30, 1938. A. P. ARMINGTON Re. 20,837

RESILIENT CONNECTION

Original Filed Dec. 7, 1934

INVENTOR
ARTHUR P. ARMINGTON
BY
Brockett, Hyde, Higley & Meyer
ATTORNEYS

Reissued Aug. 30, 1938

Re. 20,837

UNITED STATES PATENT OFFICE 20,837

RESILIENT CONNECTION

Arthur P. Armington, deceased, late of Willoughby, Ohio, by The Euclid Road Machinery Company, Euclid, Ohio, assignee Original No. 2,073,617, dated March 16, 1937, Serial No. 756,501, December 7, 1934. Application for reissue June 23, 1938, Serial No. 215,516

9 Claims. (Cl. 280—33.1)

This invention relates to means for interconnecting large heavy objects for connection of one to the other or support of one on the other to permit limited yieldably opposed motion therebetween. The invention thus comprises a heavy duty mounting means useful for application in various places, such as between an engine and its base, or between the frame of a railway vehicle and its running gear. For purposes of illustration, and in no sense of limitation, the invention has been shown applied to hitch means for connecting tractor and trailer vehicles and particularly large heavy-duty trailer vehicles having rigid drawbars and which may be so proportioned that their drawbars have load-supporting as well as draft functions. Obviously the hitch connection between a pair of such vehicles should freely permit angularity between the vehicles about an upright axis for steering purposes. It is desirable also that there be some resilient characteristics to the hitch effective to permit their relative angular motion in other directions and their relative displacement in the draft direction. Particularly another hitch requirement is of course ease of attachment and detachment. While the present invention, as part of its general objects, meets the above conditions, by simple and inexpensive as well as novel means, a primary object of the invention is to provide automatic unhitching between the vehicles upon attainment therebetween of angularity other than above the upright steering axis; so that should the trailer tip over sideways, it will not carry the tractor with it, or should the trailer become stalled, the tractor cannot be caused to somersault backwards under its own power—in either case protecting the tractor operator.

A special object of the invention is to provide for the described flexibility by the employment of resilient nonmetallic material such as rubber, as a single member of improved form.

Figure 1:
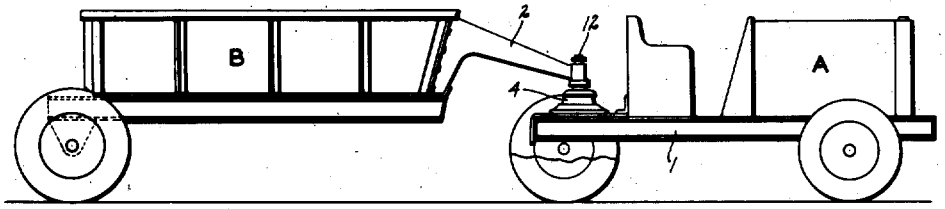
Figure 2:
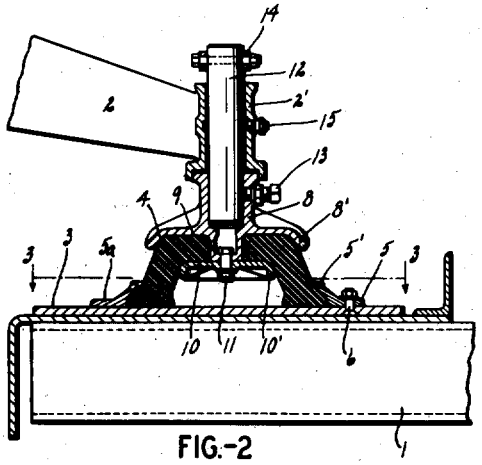
Figure 4:
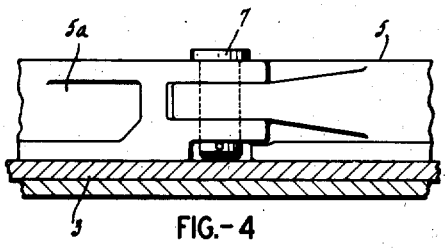
Figure 3:
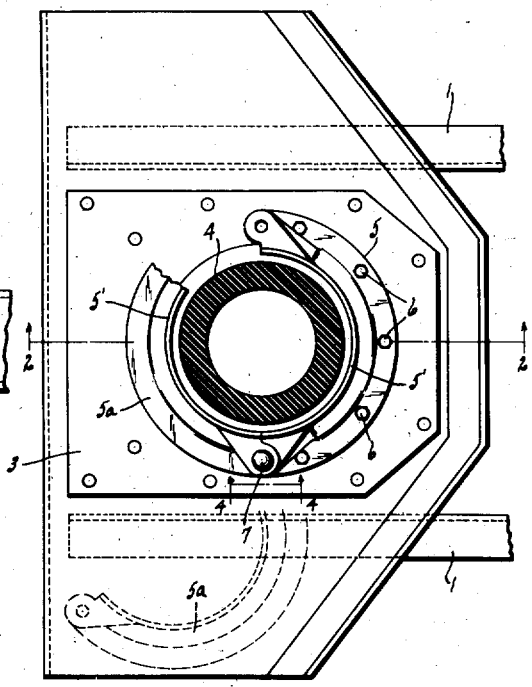
Figure 5:
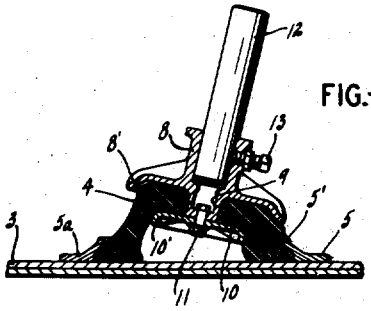

The exact nature of the invention together with further objects and advantages thereof will be apparent from the following description taken in connection with the accompanying drawing, in which Fig. 1 is a conventionalized side elevation of a typical tractor and trailer vehicle combination to which the invention is applied; Fig. 2 is an enlarged sectional elevation in the central longitudinal plane of the vehicles, showing details of the hitch means effective therebetween; Fig. 3 is a horizontal section as in the plane of line 3—3, Fig. 2, and indicating at line 2—2 the plane of the section of Fig. 2; Fig. 4 is a further enlarged sectional elevation as in the plane of line 4—4, Fig. 3, illustrating details of the hitch means, and Fig. 5 is a view of parts appearing in Fig. 2, illustrating their manner of operation.

With reference now to the drawing, A represents generally a tractor vehicle here indicated as of the usual four-wheeled type, having a frame 1 supported on a front pair of steering wheels and a rear pair of driving wheels. B represents a trailer vehicle having but a single pair of wheels which may be located rearwardly as indicated, and having a forwardly extending drawbar 2 rigidly associated with the frame and/or body of the trailer, so that vertical forces—and in the illustrated case part of the trailer load—may be transmitted through the drawbar to the tractor A. As will be appreciated by one familiar with the art, the arrangement is preferable in that it permits increasing the tractive effect of the tractor driving wheels.

The rear part of the tractor is provided with a flat level platform 3 for supporting the hitch means. Resting upon this platform is a member 4 of resilient nonmetallic material such as rubber. The form of the member 4 is as appears from Figs. 2 and 3, generally that of a hemisphere, a bell or a cone, preferably symmetrical about an upright axis and circular in horizontal section, and bowed in typical vertical section. Essentials of the form of the member 4 are that it be of such nature that its periphery may be secured to one of the vehicles, and that it may be secured to the other vehicle at a location effectively within its periphery, that it may support the front end of the trailer upon the tractor, and that its securement at one or the other of these locations be automatically releasable under certain conditions, as will appear.

In the present arrangement, the member 4 is disposed to provide an arch in typical vertical section, and its peripheral part, which is its larger or mouth end, rests upon the platform 3 and is there confined by a clamp ring 5. This ring 5 is split as indicated in Fig. 3, having a forward half rigidly secured upon the tractor as by the bolts 6, and a rearward half 5a having its ends in releasable relation with the forward half 5 as by pins 7. The arrangement will be recognized as one wherein the rearward half 5a of the ring may be swung outwardly upon one of the pins 7 as a hinge, by removal of the other pin 7 so that the ring thus opened up may receive the member 4 slid over the face of the platform 3. The ring 5 has a lip 5' extending upwardly and inwardly about the peripheral part of the member 4 which flares outwardly somewhat under the lip 5', all as illustrated in Fig. 2.

Seated upon the member 4 is a cap 8 having a peripheral lip 8' overhanging the member 4 as indicated in Fig. 2. The member 8 has a central part 9 extending downwardly through a central opening in the member 4, and a clamp plate 10 is rigidly secured to the member 8 as by a bolt 11 to confine the central part of the member 4 between the annular faces of the members 8 and 10. The member 10 has a peripheral lip 10' curved as indicated in Fig. 2, to prevent its cutting into the member 4.

The member 8 has a central socket to receive an upright post 12 secured with the member 8 as by set screw 13. The drawbar 2 has a rigidly associated head 2' with an upright opening to receive the post 12 and rest upon the cap member 8. A collar 14 is secured upon the post 12 to retain the drawbar 2 thereupon. A fitting 15 is preferably provided for lubrication of the bearing of the drawbar 2 about the post 12 and upon the member 8.

Operation will be as follows: It will be apparent that the member 4 is effective in resilience between the supporting platform member 3 and the drawbar member 2 to be supported. It supports the vertical load of the trailer drawbar upon the tractor transmitting the downward force of the drawbar head 2', to the platform 3 of the tractor, in which function the material of the member 4 is stressed in compression vertically throughout. Under draft forces the ring 5 on the tractor confining the base part of the member 4, and the head part 2' of the rigid trailer drawbar maintaining the post 12 vertical, and the rigidly associated parts 8 and 10 being horizontally disposed, the parts of the member 4 will give in horizontal planes sufficiently to produce yieldable draft characteristics absorbing shock forces between the vehicles. Angularity between the vehicles about the upright axis provided by the post 12, is freely permitted for steering purposes.

In travel of the vehicles over uneven terrain, a certain amount of angularity is permitted the vehicles other than about the central upright axis of the hitch parts, the material of the member 4 yielding for the purpose as indicated in Fig. 5. In all such motion, material on one side of the axis will be stressed in compression as at the right in Fig. 5, and that on the opposite side of the axis will be stressed generally in tension as at the left in Fig. 5. Obviously in all these motions, that of the post 12 relative to the platform 3, may be fore-and-aft, lateral, or combinations of both, and both angular and translatory; the curved contours of the lips 5', 8' and 10' preventing cutting of their parts against the member 4. There is thus a universal joint effect resulting from the described resilient effect, both accomplished by the flexure of the member 4, wherein the resilience of the member 4 may oppose or assist relative motion between the vehicles but with slight effect. Should the angularity between the vehicles other than about the upright axis, increase beyond a certain point, as about a longitudinal axis where the trailer vehicle might tip over sideways, or about a transverse axis where the front end of the tractor might be raised from the ground by the tractor power, the tension on the member 4 at one side of the axis as at the left in Fig. 5, will cause the material to flow, sufficiently diminishing its sectional thickness to the extent that ultimately and before harm is done, the member 4 will snap out of the confining ring 5, thus automatically unhitching the trailer from the tractor, releasing the latter and thereby protecting its operator.

In ordinary usage, member 4 is maintained mounted upon the drawbar so that the movable part of the ring 5a is manipulated to accomplish the hitching operation. This will be as follows, the part 5a being swung to open position as indicated in broken lines in Fig. 3. The drawbar with the member 4 is positioned to rest upon the platform 3. Then the vehicles are moved together, sliding the member 4 over the platform until it seats against the forward fixed half of the ring 5. The rear half 5a is then swung forwardly to close upon the member 4 and is there secured by replacing the withdrawn pin 7. In manual as distinguished from automatic unhitching, the reverse operations will be followed.

It will be observed that the arched form of the resilient member 4 has two particular advantages. It is best adapted to support the weight of the trailer loaded upon it, a maximum sectional area of its material being stressed in compression for the purpose. And in tilting motions between the vehicles, a maximum volume of its material is flexed, with ample space for flow, and especially hitch-releasing flow, of the flexed material.

What is claimed is:

1. Means for hitching a trailer vehicle to a tractor vehicle and comprising non-metallic resilient means constructed and arranged to be effective to transmit draft forces between said vehicles and to permit yieldably limited motion therebetween, and including for the purpose means securing said resilient means centrally to one of said vehicles and means securing said resilient means peripherally to the other vehicle, one of said securing means being arranged to release said resilient means automatically dependent upon attainment of limited angularity between said vehicles other than about an upright axis.

2. Means for hitching a trailer vehicle to a tractor vehicle and comprising non-metallic resilient means constructed and arranged to be effective to transmit draft forces between said vehicles and to permit yieldably limited motion therebetween, and including for the purpose means securing said resilient means centrally to one of said vehicles and means securing said resilient means peripherally to the other vehicle and arranged to release said resilient means automatically dependent upon attainment of limited angularity between said vehicles other than about an upright axis.

3. In combination with a tractor and a trailer therefor having a rigid drawbar adapted to support part of the trailer load, hitch means for said vehicles comprising resilient means peripherally secured on said tractor, an upright post centrally mounted on said resilient means, said trailer drawbar being mounted on said post to permit steering motion thereabout, said peripheral securing for said resilient means being arranged to release the latter by excess angular displacement between said vehicles other than about said post, but permitting a limited amount of said displacement.

4. Means for hitching a trailer vehicle to a tractor vehicle and comprising a resilient member generally of bell shape disposed upon an upright axis, means centrally securing the smaller end of said member to one of said vehicles and permitting free steering angularity between the vehicles, the other vehicle having a horizontally disposed face, and means removably securing the larger end of said member against said face and comprising means disposed peripherally of said larger end, overhanging the latter, secured to said face, and having a part removable from said end to permit withdrawal of said member in the direction of extent of said face.

5. Means for hitching a trailer vehicle to a tractor vehicle and comprising a resilient member generally of bell shape, with bowed characteristic in central upright sectional planes, means centrally securing the smaller end of said member to one of said vehicles and permitting free steering angularity between the vehicles, means peripherally securing the larger end of said member to the other vehicle, said member being so formed to include a hollow portion intermediate its said ends, internally and externally free from lateral support.

6. Means for hitching a trailer vehicle to a tractor vehicle and comprising a resilient member generally of bell shape, with arched characteristic in central upright sectional planes, means peripherally securing the lower end of said member upon the tractor vehicle, means centrally securing the upper end of said member to the trailer vehicle and permitting free steering angularity between said vehicles, said member having a hollow portion intermediate its ends, internally and externally free from lateral support.

7. Means providing yieldable support between a pair of members and comprising a resilient element of rubber or the like, generally of arched section, having an end wall and opposed side walls extending divergently therefrom, means securing said end wall to one of said members with clamping effect thereupon endwise of said element, and means securing the extremities of said element side walls to the other member with clamping effect thereupon both endwise and lateral of said element, said side walls having substantial free length between said securing means.

8. Means providing yieldable support between a pair of members and comprising a resilient element of rubber or the like, generally of bell shape, having an end wall and an endless side wall extending divergently therefrom to an endless mouth substantially larger than said end wall, means securing said end wall to one of said members with clamping effect endwise of said element, and means securing said element mouth to the other member with clamping effect both endwise and peripheral of said mouth, said side wall having substantial free sloping extent between said securing means.

9. A member and a resilient element having cooperative bearing faces, said element having laterally opposed wall portions leading convergently from said member and providing a cavity leading convergently a substantial extent from its face, retaining means about said element, with obliquely disposed face portions in clamping relation against said convergent element wall portions adjacent said bearing faces, and means detachably securing said retaining means upon said member to maintain the bearing of said faces against each other.

THE EUCLID ROAD
MACHINERY COMPANY,
*Assignee of Arthur P. Armington, Deceased,*
By GEORGE A. ARMINGTON,
*President.*